United States Patent
Li et al.

(10) Patent No.: US 6,865,269 B1
(45) Date of Patent: Mar. 8, 2005

(54) METHOD AND APPARATUS FOR SWITCH HOOK DETECTION

(75) Inventors: Jin Li, Austin, TX (US); Merle L. Miller, Austin, TX (US)

(73) Assignee: Legerity, Inc., Austin, TX (US)

( * ) Notice: Subject to any disclaimer, the term of this patent is extended or adjusted under 35 U.S.C. 154(b) by 0 days.

(21) Appl. No.: 09/558,187

(22) Filed: Apr. 26, 2000

(51) Int. Cl.[7] .............................................. H04M 3/22
(52) U.S. Cl. .................................. 379/377; 379/399.01
(58) Field of Search ................................. 379/377–380, 379/399.07

(56) References Cited

U.S. PATENT DOCUMENTS

| | | | | |
|---|---|---|---|---|
| 4,277,648 A | * | 7/1981 | Glassman | 379/111 |
| 5,583,934 A | * | 12/1996 | Zhou | 379/399.02 |
| 5,636,273 A | * | 6/1997 | Schopfer et al. | 379/412 |

* cited by examiner

*Primary Examiner*—Xu Mei
*Assistant Examiner*—Walter F. Briney, III
(74) *Attorney, Agent, or Firm*—Williams, Morgan & Amerson, P.C.

(57) ABSTRACT

A method and apparatus is provided. The method includes receiving a signal over a connection from a telephonic device, determining if the signal is greater than a first preselected value, and adjusting a transient response time of a host transceiver configured to receive the signal in response to determining that the signal is greater than the first preselected value. The method further includes determining a switch hook state of the telephonic device based on a DC component of the signal. The apparatus includes first logic capable of receiving a signal over a connection from a telephonic device, second logic capable of determining if the signal is greater than a first preselected value, and third logic configured to receive the signal, the third logic being capable of adjusting a transient response of the apparatus configured to receive the signal in response to determining that the signal is greater than the first preselected value. The apparatus further includes fourth logic capable of determining a switch hook state of the telephonic based on a DC component of the signal.

24 Claims, 9 Drawing Sheets

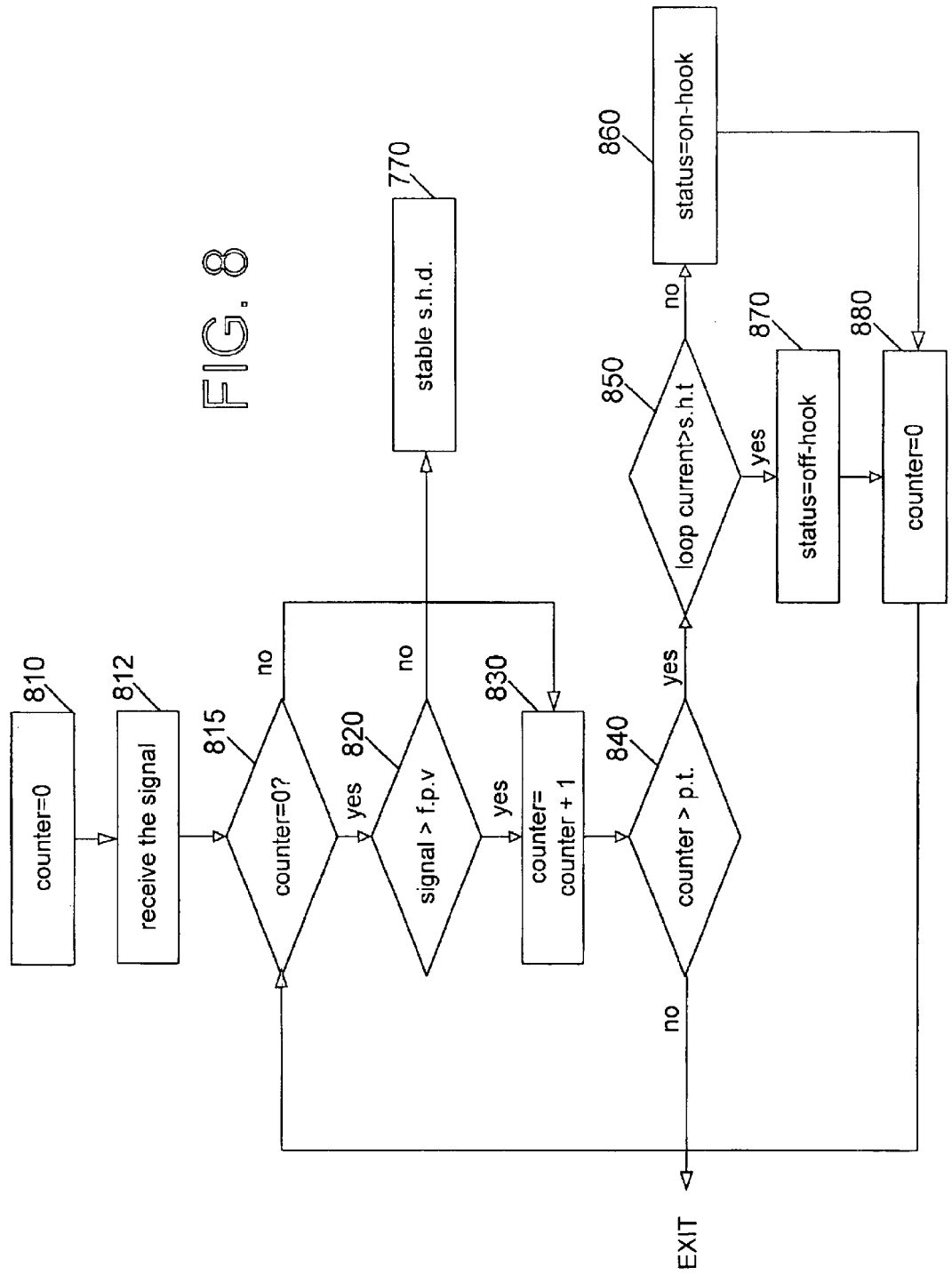

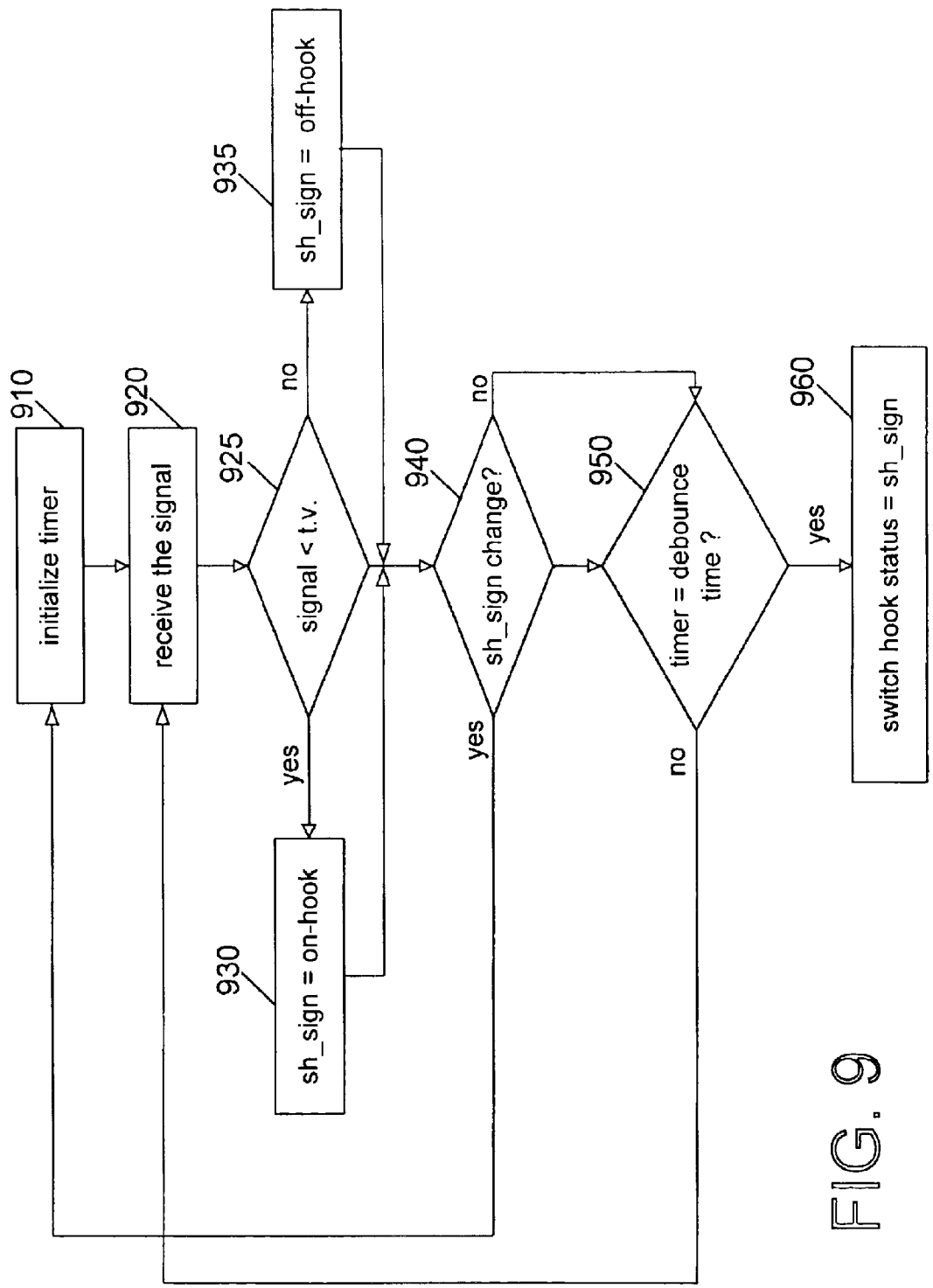

METHOD AND APPARATUS FOR SWITCH HOOK DETECTION

BACKGROUND OF THE INVENTION

1. Field of the Invention

This invention relates generally to telecommunications, and, more particularly, to a method and apparatus for switch hook detection for a telephone line card.

2. Description of the Related Art

In communications systems, particularly telephony, it is a common practice to transmit signals between a subscriber station and a central switching office via a two-wire bi-directional communication channel. A line card generally connects the subscriber station to the central switching office. A line card typically includes at least one subscriber line interface circuit (SLIC) as well as a subscriber line audio-processing circuit (SLAC). The primary functions of the line card may include supplying talk battery, performing impedance matching, determining whether telephonic equipment is on-hook or off-hook, and handling ringing signals, voice signals, and testing signals.

Subscriber line interface circuits generally include a switch-hook detection circuit that supervises telephone operation by detecting whether a telephone is either on-hook or off-hook. An "off-hook" condition occurs when an end user lifts the handset of a telephone from the cradle, thereby activating the telephone's hook switch. Conversely, an "on-hook" condition occurs when the handset is placed back in the telephone cradle, thereby terminating the telephone service. Upon detecting the on-hook or off-hook condition, the switch-hook information is passed to the system software of the line card, which then either provides or terminates service.

Upon requesting service, a user may establish a connection with a remote user by dialing the telephone number of that user. Telephone dialing may be in the form of dial pulses or tones. Pulse dialing includes generating of a series of electrical interrupts or pulses across the telephone line. One method of generating electrical pulses is by toggling between on-hook and off-hook states such that each transition from an on-hook to off-hook state represents one pulse. The number of pulses generated usually represent the digit that is dialed.

The off-hook/on-hook ratio (also referred to as make/break ratio) applied to the loop during pulse dialing is typically 40 to 60; that is, the loop is closed 40 percent of the time and is open 60 percent of the time. The break interval is generally allowed to vary from about 58 percent to 64 percent. However, because of the pulse distortion caused by the loop, the pulse receivers or detectors in the central office must be able to properly respond to a break interval of 55 percent to 65 percent. The dial rate can vary between 8 and 12 pulses per second.

A telephone system needs DC feed to control the battery feed to the subscriber loop. DC feed delivers enough power for long loop and gradually reduces the power for short loop. A digital signal processing algorithm controls the DC feed curve. During the transition from off-hook to on-hook, the loop impedance changes from low to high and the measured loop voltage between the tip and ring terminals goes from low to high. Generally, an electronic DC feed control is slow to react to sudden changes in the loop impedance. As such, if the loop impedance is high enough during an off-hook to on-hook transition, the DC feed driver may be saturated.

Saturation may occur because an impedance change on a subscriber loop causes a DC level shift between several volts to ten volts or more, depending upon the loop current. The SLAC devices are typically five-volt digital components with a maximum peak to peak operating voltage of less than five volts. Thus, a sudden DC level shift causes one or more components within the SLIC and SLAC devices to saturate, sometimes for as long as 80 milliseconds, which may interfere with normal operation of such devices.

During saturation, the measured loop voltage between the tip and ring terminals and the measured current may not accurately reflect the loop condition. Thus, an inaccurate measurement of the loop impedance may result in a false detection, thereby causing switch-hook distortion. In addition, switch-hook distortion may also occur during pulse dialing because of capacitance and inductance present on the subscriber line or may occur when additional telephones go off-hook/on-hook on the subscriber loop, thereby causing a sudden impedance fluctuation.

Existing methods for pulse dial detection that rely on comparing loop impedance to an impedance threshold suffer from several shortcomings. First, the DC feed control in existing systems is generally too slow to react to sudden changes in loop impedance, especially considering that 8 to 12 pules may be generated every second. Second, the presence of non-linear load, such as a zenior diode, for example, may yield inaccurate results for pulse dial detection if such detection is based on a change in the loop impedance. Third, the detection time for on-hook indication (T1) and off-hook indication (T2) may vary considerably from one loop to another because of loop characteristics, which means that the difference between the on-hook indication time and off-hook indication (T1–T2) may also vary from loop to loop. The variance in the difference between the on-hook and off-hook indications is undesirable, as some systems require such variance to be within a relatively small range (e.g., 5 milliseconds).

The present invention is directed to overcoming, or at least reducing the effects of, one or more of the problems set forth above.

SUMMARY OF THE INVENTION

In one aspect of the present invention, a method is provided. The method includes receiving a signal over a connection from a telephonic device, determining if the signal is greater than a first preselected value, and adjusting a transient response time of a host transceiver configured to receive the signal in response to determining that the signal is greater than the first preselected value. The method further includes determining a switch hook state of the telephonic device based on a DC component of the signal.

In another aspect of the present invention, an apparatus is provided. The apparatus includes first logic capable of receiving a signal over a connection from a telephonic device, second logic capable of determining if the signal is greater than a first preselected value, and third logic configured to receive the signal, the third logic being capable of adjusting a transient response of the apparatus configured to receive the signal in response to determining that the signal is greater than the first preselected value. The apparatus further includes fourth logic capable of determining a switch hook state of the telephonic device based on a DC component of the signal.

BRIEF DESCRIPTION OF THE DRAWINGS

The invention may be understood by reference to the following description taken in conjunction with the accompanying drawings, in which like reference numerals identify like elements, and in which:

FIG. 8 depicts an alternative method for dial pulse detection in accordance with the present invention that may be implemented by the host transceiver of FIG. 2; and FIG. 9 illustrates a method for switch hook detection during stable state in accordance with the present invention that may be implemented by the host transceiver of FIG. 2.

Figure 1:
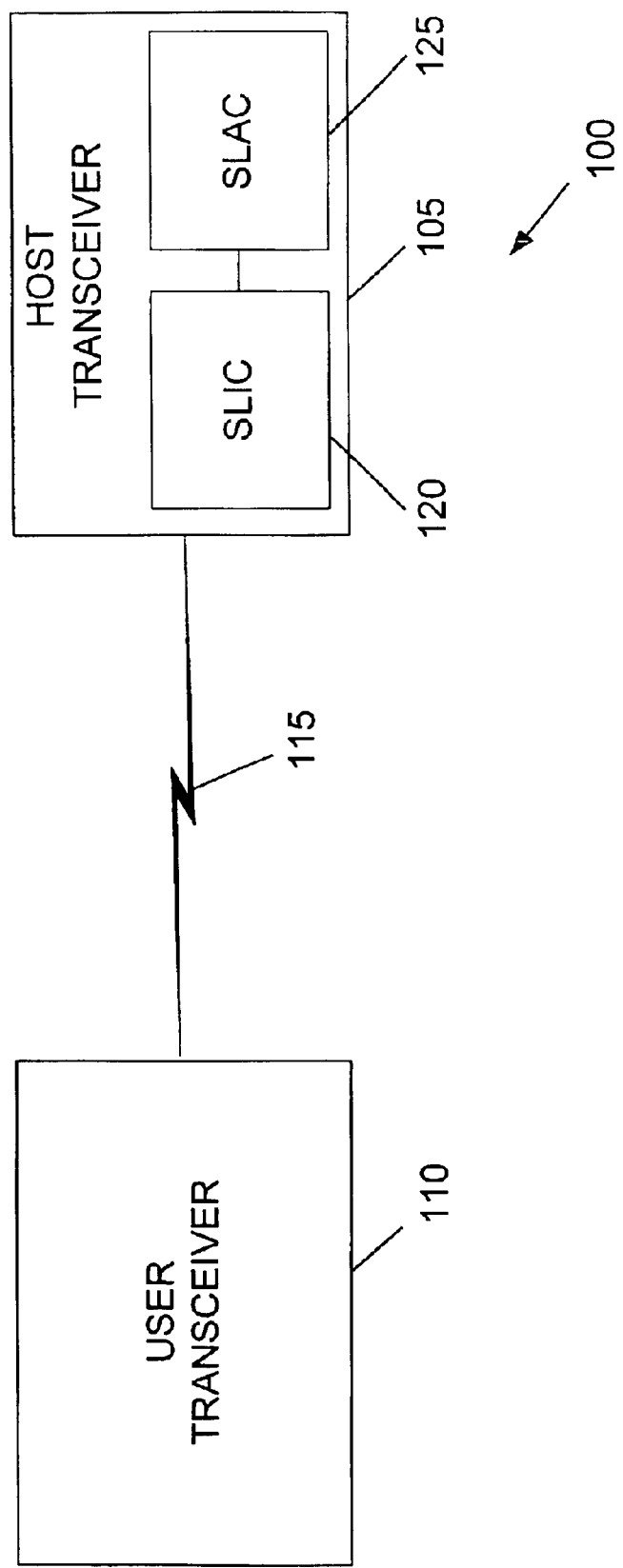
FIG. 1 illustrates a communications system in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to the drawings, and in particular to FIG. 1, a communications system 100 in accordance with the present invention is illustrated. The communications system 100 includes a host transceiver 105 and a user transceiver 110 capable of communicating with each other over a connection 115. The connection 115 may be a wire-line connection. An example of a wire-line connection includes a subscriber line, which may comprise a Public Switched Telephone Network (PSTN) line, a Private Branch Exchange (PBX) line, or any other medium capable of transmitting signals.

The host transceiver 105 may be any device capable of interfacing with the user transceiver 110, although in the illustrated embodiment the host transceiver 105 is a line card, which may be located at a central office or at a remote location somewhere between the central office and the user transceiver 110. The host transceiver 105 comprises a subscriber line interface circuit (SLIC) 120 and a subscriber line audio-processing circuit (SLAC) 125. The SLIC 120 is capable of performing a variety of functions, such as battery feed, overload protection, polarity reversal, on-hook transmission, and current limiting. The SLAC 125 is capable of processing analog-to-digital (A/D) and digital-to-analog (D/A) signal conversion, filtering, feed control, and supervision.

The user transceiver 110 may be a telephonic device capable of supporting pulse dialing. The term "telephonic device," as utilized herein, includes a telephone, or any other device capable of providing a communication link between at least two users. In one embodiment, the user transceiver 110 may be one of a variety of available conventional telephones, such as wired telephones and similar devices. In an alternative embodiment, the user transceiver 110 may be any device capable of performing a substantially equivalent function of a conventional telephone, which may include, but is not limited to, transmitting and/or receiving voice and data signals. Examples of the user transceiver 110 include a data processing system (DPS) utilizing a modem to perform telephony, a television phone, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through DPS speakers. The calls travel over the Internet as packets of data on shared lines, avoiding the tolls of the PSTN.

Figure 2:
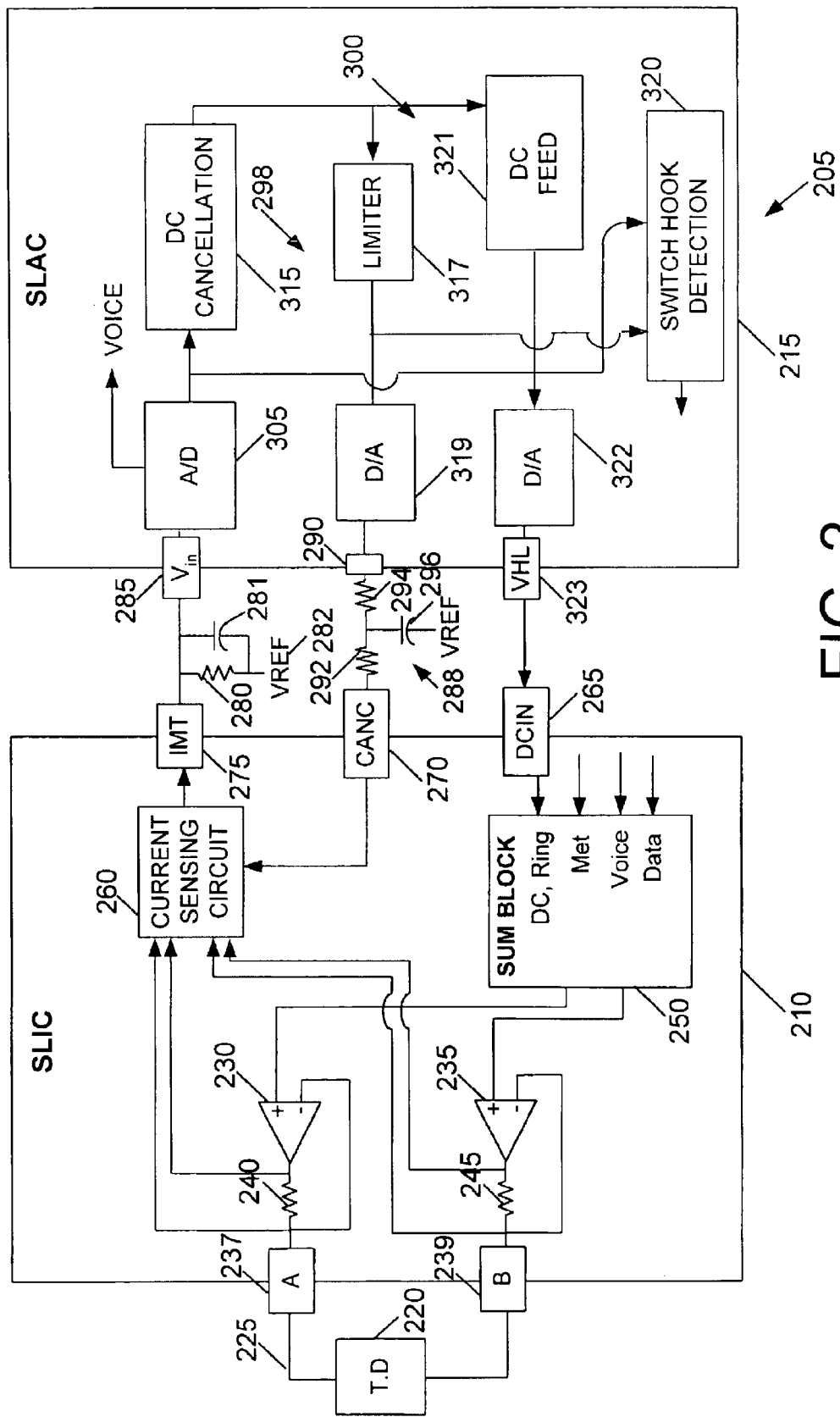
FIG. 2 depicts a block diagram of an embodiment of a host transceiver in accordance with the present invention that may be implemented in the communications system of FIG. 1.

FIG. 2 illustrates one embodiment of the host transceiver 105. Specifically, the host transceiver 105 in the illustrated embodiment is a telephone line card 205 that includes a voltage-feed SLIC 210 and a SLAC 215. In the illustrated embodiment, the line card 205, in addition to supporting plain old telephone service (POTS), is adapted to implement an asynchronous digital subscriber line (ADSL) modem for high bandwidth data transfer. The ADSL protocol is described in ANSI T1.413 Issue 2, entitled, "Interface Between Networks and Customer Installation—Asymmetric Digital Subscriber Line (ADSL) Metallic Interface." The line card 205 may be located at a central office or a remote location somewhere between the central office and the user transceiver 110 (see FIG. 1). The line card 205 services the user transceiver 110, which in the illustrated embodiment is a telephonic device 220, via the SLIC 210. The connection 115 (see FIG. 1) in the instant embodiment is a telephone line 225. The combination of the telephone device 220 and the telephone line 225 is generally referred to as a subscriber loop.

The line card 205, which may be capable of supporting a plurality of telephone lines 225, performs, among other things, two fundamental functions: DC loop supervision and DC feed. The purpose of DC feed is to supply enough power to the telephone device 220 at the customer end. The purpose of DC loop supervision is to detect changes in DC load, such as on-hook events, off-hook events and rotary dialing, or any other event that causes the DC load to change. In the interest of clarity and to avoid obscuring the invention, only that portion of the line card 205 that is helpful to an understanding of the invention is illustrated.

The voltage-feed SLIC 210 is a high voltage bipolar SLIC that drives voltages to the telephone line 225 and senses current flow in the telephone line 225. The SLIC 210 includes first and second differential line drivers 230, 235 that interface with the telephone line 225 via tip and ring terminals 237, 239. The tip terminal 237 is coupled to a first terminal of a first sensing resistor (Rb) 240 and to an inverting terminal of the first line driver 230. A second terminal of the first sensing resistor 240 is coupled to an output terminal of the first line driver 230. The ring terminal 239 is coupled to a first terminal of a second sensing resistor ($R_{bd}$) 245 and to an inverting terminal of the second line driver 235. A second terminal of the second sensing resistor 245 is coupled to an output terminal of the second line driver 235.

The SLIC 210 includes a sum block 250 and a current-sensing circuit 260. The sum block 250 includes a first output terminal coupled to a non-inverting terminal of the first line driver 230, and a second (inverted) output terminal coupled to a non-inverting terminal of the second line driver 235. The sum block 250 is capable of receiving a DC feed signal (as well as metering and ringing signals) from a DCIN terminal 265, a voice signal, a metering signal, and a data signal and is capable of adding one or more of the received signals and providing it to the first and second line drivers 230, 235. The signals into the SUM block 250 may be subjected to different levels of gain for optimal performance. The signal from the DCIN terminal 265 is low-pass filtered. The current-sensing circuit 260 produces a current proportional to the current through the current sensing resistors 240, 245, subtracts a current proportional to a current from a cancellation terminal (CANC) 270, and provides the resulting current to an IMT terminal 275 of the SLIC 210. Although not so limited, in the instant embodiment, the constant of proportionality for the current from the cancellation terminal (CANC) 270 is unity, and the constant of proportionality for the metallic line current is 0.001. Those skilled in the art will appreciate that only those portions of the SLIC 210 deemed relevant to the invention are disclosed herein. The SLIC 210 may employ resistors or other circuitry that is not illustrated in FIG. 2.

Although the SLIC 210 illustrated in FIG. 2 is a voltage-feed SLIC in which a voltage is applied to the subscriber loop and a resulting current is measured, it is contemplated that a current-feed SLIC may also be utilized in the line card 205 in accordance with the instant invention. In a current-feed SLIC, a current is fed to the subscriber loop and the measured electrical parameter is the resulting voltage.

The SLIC 210 is connected to the SLAC 215 as well as to an external resistor 280, as well as a capacitor 281. A first terminal of the resistor 280 is coupled to the IMT terminal 275 of the SLIC 210, as well as to the VIN terminal 285 of the SLAC 215. A second terminal of the resistor 280 is coupled to a reference voltage node 282, as well as to a terminal of the capacitor 281. In one embodiment, the reference voltage 282 is in the range of about 1.4 volts. The external resistor 280 and the capacitor 281 form a single-pole low pass filter that is capable of filtering at least a portion, if not all, of the signals above the voice band, such as data signals and metering signal. The combination of the external resistor 280 and the capacitor 281 contributes in converting the current flowing from the IMT terminal 275 to a proportional voltage signal for the SLAC 215. Although not necessary, the resistor 280 is external in the illustrated embodiment because in some embodiments it may be useful for the drive value of the resistor to be relatively precise and because each line card 205 may require different values.

A discrete network 288 couples the SLIC 210 to the SLAC 215 via the CANC terminals 270, 290. The discrete network 288 includes a first and second resistor 292, 294 and a capacitor 296. A first terminal of the first resistor 292 is coupled to the CANC terminal 270 of the SLIC 210 and a second terminal of the first resistor 292 is coupled to a first terminal of the second resistor 294. The second terminal of the second resistor 294 is coupled to the CANC terminal 290 of the SLAC 215. The capacitor 296 is coupled between the second terminal of the first resistor 292 and the reference voltage node 296. The discrete network 288 acts as a low pass filter and converts the voltage output signal from the SLAC 215 to a current and provides it to the SLIC 210.

The SLAC 215 interfaces with the telephonic device 220 through the SLIC 210 and over the telephone line 225. The SLAC 215 includes two feedback loops: a DC cancellation loop 298 and a DC feed loop 300. In the illustrated embodiment, the two loops 298, 300 are implemented within a digital signal processor (DSP). Only those portions of the SLAC 215 deemed relevant to the instant invention are described herein, albeit the SLAC 215 may perform a variety of other functions that are not illustrated in FIG. 2.

The DC cancellation loop 298 includes an analog-to-digital converter 305, DC cancellation logic 315, a current limiter 317, and a digital-to-analog converter 319. In the illustrated embodiment, to reduce hardwire complexity, the voice and DC components of the input signal from the VIN terminal 285 share the same analog-to-digital converter 305. The analog-to-digital converter 305 and digital-to-analog converter 319 include a decimator and interpolator, respectively. The analog-to-digital converter 305 in the illustrated embodiment is capable of providing two output signals, the first output signal is sampled at a 4 KHz frequency and provided as a digital signal to the DC cancellation logic 315, as well as to a switch hook detection logic 320. The second output signal of the analog-to-digital converter 305, comprising of voice and/or data (residual) components, is sampled at 32 KHz and provided to a CODEC (not shown). A residual data component may exist at the output of the, analog-to-digital converter 305 since the single-pole low pass filter comprising the external resistor 280 and capacitor 281 may not remove all of the data signal. The DC cancellation logic 315 receives the digital signal from the analog-to-digital converter 305, filters high frequencies, and provides substantially a DC signal. The DC signal is provided as an input to the DC feed logic 321, as well as to the current limiter 317. The output of the current limiter 317 is converted to an analog signal and then provided back to the SLIC 210 via the CANC terminal 270. The output of the current limiter 317 is also provided to the switch hook detection logic 320 for switch hook detection during pulse dialing, as described in more detail below. The current provided to the CANC terminal 270 of the SLIC 210 is used to cancel the DC component of the signal from the current sense circuit 260.

Without sudden or other impedance changes, the line card 205 operates in a "stable" state. During the "stable" state, the signal provided from the VIN terminal 285 of the SLAC 215 to the analog-to-digital converter 305 comprises primarily voice and data (residual) components (i.e., substantially no transient component caused by DC jumps). Thus, during the "stable" state, there is substantially no transients because the current signal provided to the CANC terminal 270 of the SLIC 210 from the SLAC 215 is substantially equal to the loop current during the "stable" state. During the "stable"

state, the output of the DC cancellation logic 315 is constant and is proportional to the DC line current. Furthermore, during the "stable" state, when substantially no transients are present, the signal level of the voice and data (residual) components does not exceed one-half of the value of the VIN terminal 285. When the signal level of the VIN terminal 285 is not saturated, the DC cancellation loop 298 behaves like a single pole high pass filter to the CODEC (not shown) and a single pole low-pass filter to the output of the DC cancellation logic 315. This means, as described in more detail below, that the output of the DC cancellation logic 315 may be used to measure the DC feed current by the DC feed logic 321 for supervision purposes.

When impedance fluctuations occur on the subscriber loop, one or more components of the line card 205 may be in a "saturation" state. One instance where the subscriber loop goes into saturation mode is during a transition from off-hook to on-hook state. A transition from an off-hook to on-hook state may occur when a user terminates telephone service by engaging the switch hook, or when the telephonic device 220 employs pulse dialing, which generally comprises pulses generated by a sequence of on-hook/off-hook states. During the "saturation" state, the signal from the VIN terminal 285 of the SLAC 215 may include a voice component, data (residual) component, and transient component due to DC jumps. The signal from the VIN terminal 285 may include other components as well, such as metering signals and the like. To store the line card 205 to a "stable" state, it is desirable to adjust the output of the DC cancellation logic 315 expeditiously to remove the line card 205 from saturation.

As described in more detail below, the DC cancellation logic 315 may include either a low-pass filter (not shown) having an adjustable bandwidth or an integrator (not shown) having an adjustable gain. The DC cancellation logic 315 includes one or more comparators (not shown) for comparing an incoming signal with preselected values, as described in more detail below. Low-pass filters, integrators, and comparators are generally known in the art; accordingly, these devices are not described in detail herein as one skilled in the art having the benefit of this disclosure is capable of employing these devices in a manner consistent with the instant invention. It should be appreciated that the DC cancellation logic 315 may be implemented either in hardware, software, or a combination thereof.

The DC feed loop 300, in addition to the analog-to-digital converter 305 and DC cancellation logic 315, includes DC feed logic 321 and a digital-to-analog converter 322. In the illustrated embodiment, it is presumed that the digital-to-analog converter 322 may also interpolate. The output from the digital-to-analog converter 322 is provided to a DCIN terminal 265 of the SLIC 210 via VHL terminal 323 of the SLAC 215. The DC feed logic 321 is capable of providing high DC voltage to the subscriber loop so that sufficient current (20–60 mA) can be driven through a resistance as high as 2K ohms. When the DC conditions on the subscriber loop change suddenly, the DC feed logic 321, in accordance with the present invention, adapts, allowing normal transmission to continue. Examples of sudden changes in DC conditions include on-hook, off-hook, rotary dialing, and tone signaling. When the telephonic device 220 goes off-hook, the loop impedance drops almost instantly to a value below 2K ohms. In short subscriber loops, the loop impedance may be less than 200 ohms. For the line card 205 to function and transmit information properly, the DC conditions on the subscriber loop should be stabilized quickly, and in some cases, within milliseconds.

Figure 3:
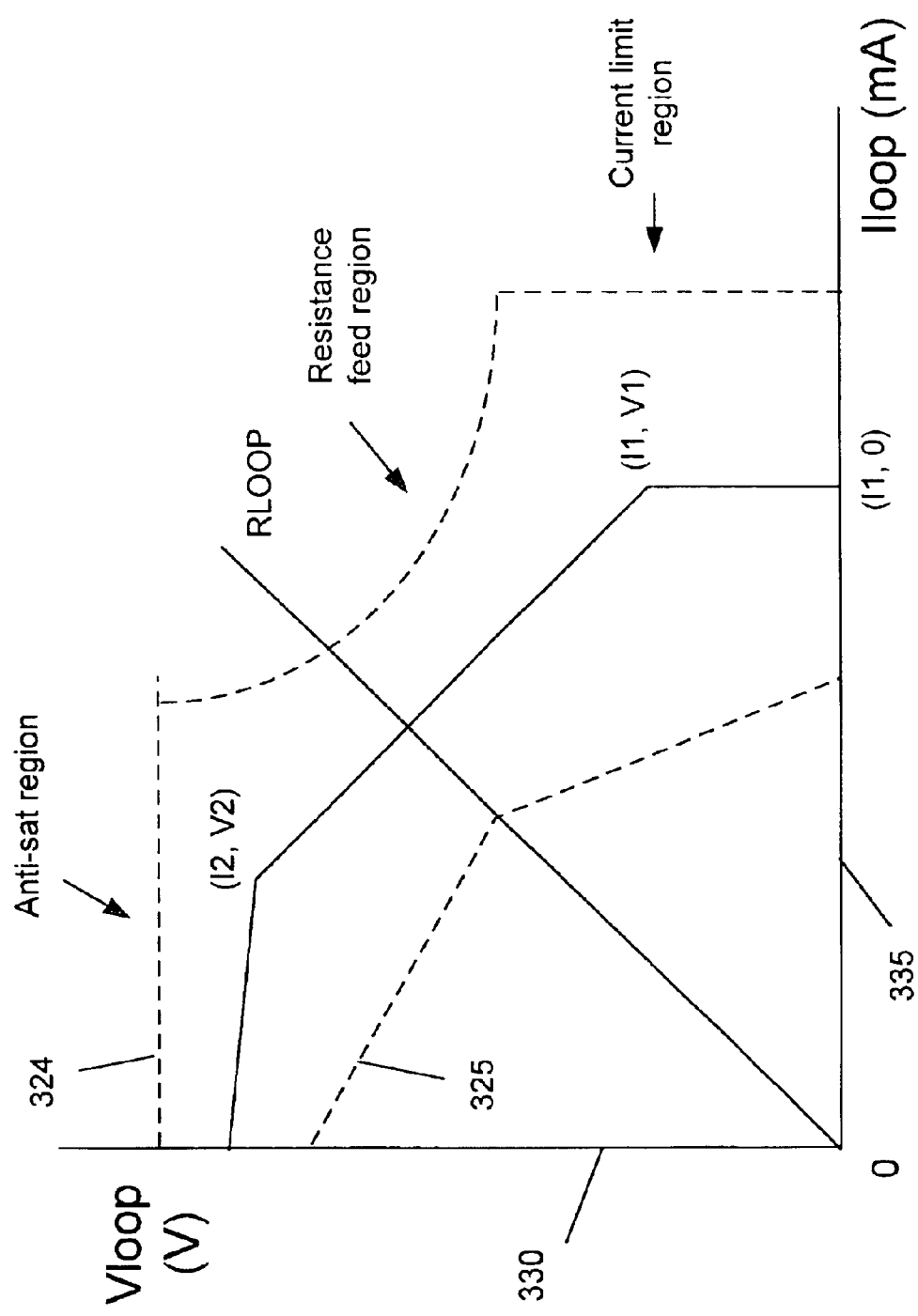
FIG. 3 depicts an exemplary DC feed curve that may be employed by the apparatus of FIG. 2.

FIG. 3 illustrates an exemplary DC feed curve that may be adapted for use by the DC feed logic 321. A dashed line 324 provides the upper limits for the electrical power, and a dashed line 325 provides the lower limits for the electrical power provided to the subscriber loop. A Y-axis 330 represents voltage, and an X-axis 335 represents current. As can be seen in FIG. 3, although not so limited, the DC feed curve includes an anti-saturation region, a resistance feed region, and a current limit region.

Figure 4:
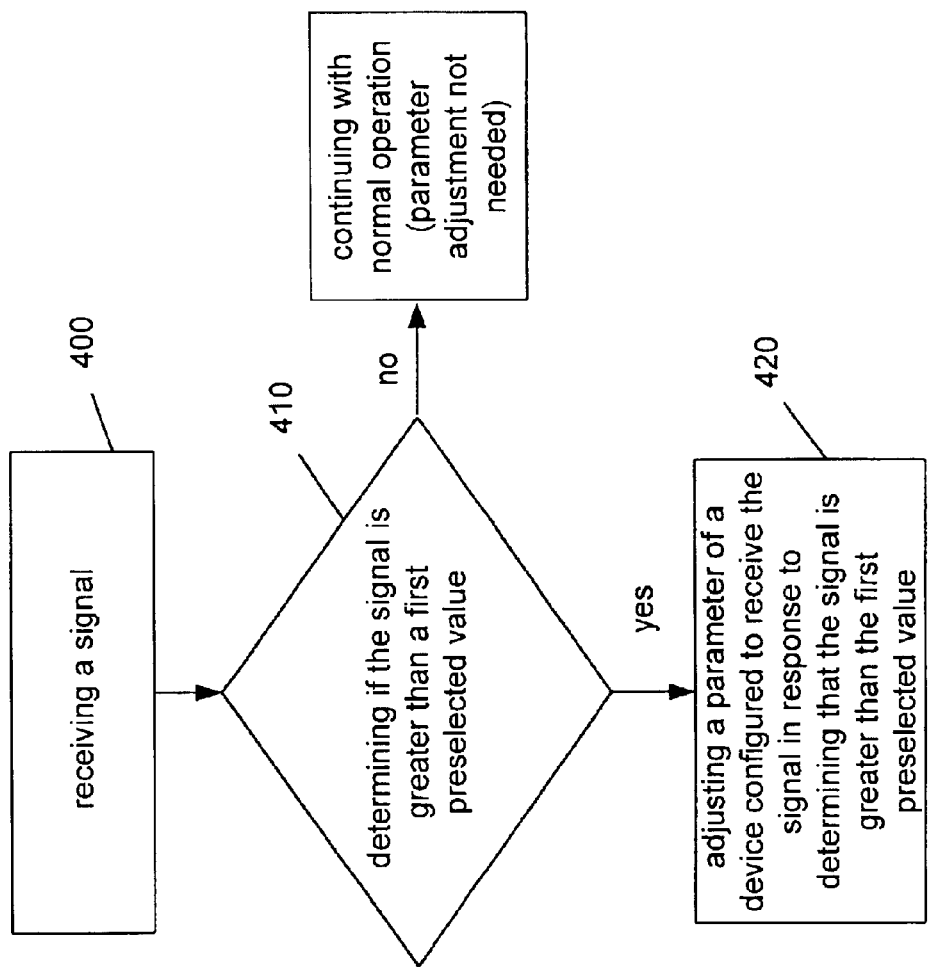
FIG. 4 illustrates a method in accordance with the present invention that may be implemented by the host transceiver of FIG. 2.

FIG. 4 illustrates a method in accordance with the present invention that may be employed by the SLAC 215 of the line card 205 of FIG. 2. The method of FIG. 4 begins at block 400, where the DC cancellation logic 315 receives a signal from the output terminal of the analog-to-digital converter 305. The signal may have an AC component (voice signal and data (residual) signal), a transient component, or both, depending on whether the line card 205 is in a "stable" or "saturation" state. At block 410, the DC cancellation logic 315 determines if the signal (absolute value) is greater than a first preselected value, wherein the preselected value is an indication that at least one of the components of the line card 205 may be in saturation. Generally, if the (absolute value) of the signal exceeds the first preselected value, it means the presence of transients due to DC jumps has exceeded one-half of the value of the voltage at the VIN terminal 285. As mentioned earlier, saturation may be caused by one of several factors, including when the telephonic device 220 makes a transition from an on-hook to off-hook state, or vice-versa. For example, the first preselected value may be in the range of about 0.75 to 1 volt with respect to the reference voltage 282, which may be 1.4 volts, for example.

At block 420, the DC cancellation logic 315 adjusts a parameter of a device (not shown) configured to receive the signal in response to determining that the signal is greater than the first preselected value. The device may be a high gain, low pass filter (not shown), wherein adjusting the parameter includes increasing a filter coefficient of the low pass filter to increase the bandwidth of the DC cancellation loop 298. In an alternative embodiment, the device may be an integrator (not shown), wherein adjusting the parameter includes increasing a step size of the integrator to increase the gain of the integrator, which thereby increases the bandwidth of the DC cancellation loop 298. The integrator causes the DC cancellation loop 298 to act like a low-pass filter. For example, the corner frequency of the DC cancellation loop 298 may be increased from 9.4 Hz (during "stable" state) to 40 Hz (during the "saturation" state). The corner frequency may be determined using equation (1) below:

$$F_{corner} = \text{step size} * R_{280}/(R_{292}+R_{294}) * F_s/2\pi, \quad (1)$$

where the step size is the step size of the integrator, $R_{280}$ is the resistor 280 (see FIG. 2), $R_{292}+R_{294}$ are resistors 292 and 294 (see FIG. 2), and $F_s$ is the sampling frequency. Hereinafter, it is presumed that the DC cancellation logic 315 includes an integrator. Increasing the bandwidth of the low pass filter or increasing the gain of the integrator increases the bandwidth of the DC cancellation loop 298, as seen from the IMT and CANC terminals 275, 270 of the SLIC 210. Increasing the step size of the integrator allows the line card 205 to recover faster from its saturation state.

Figure 5:
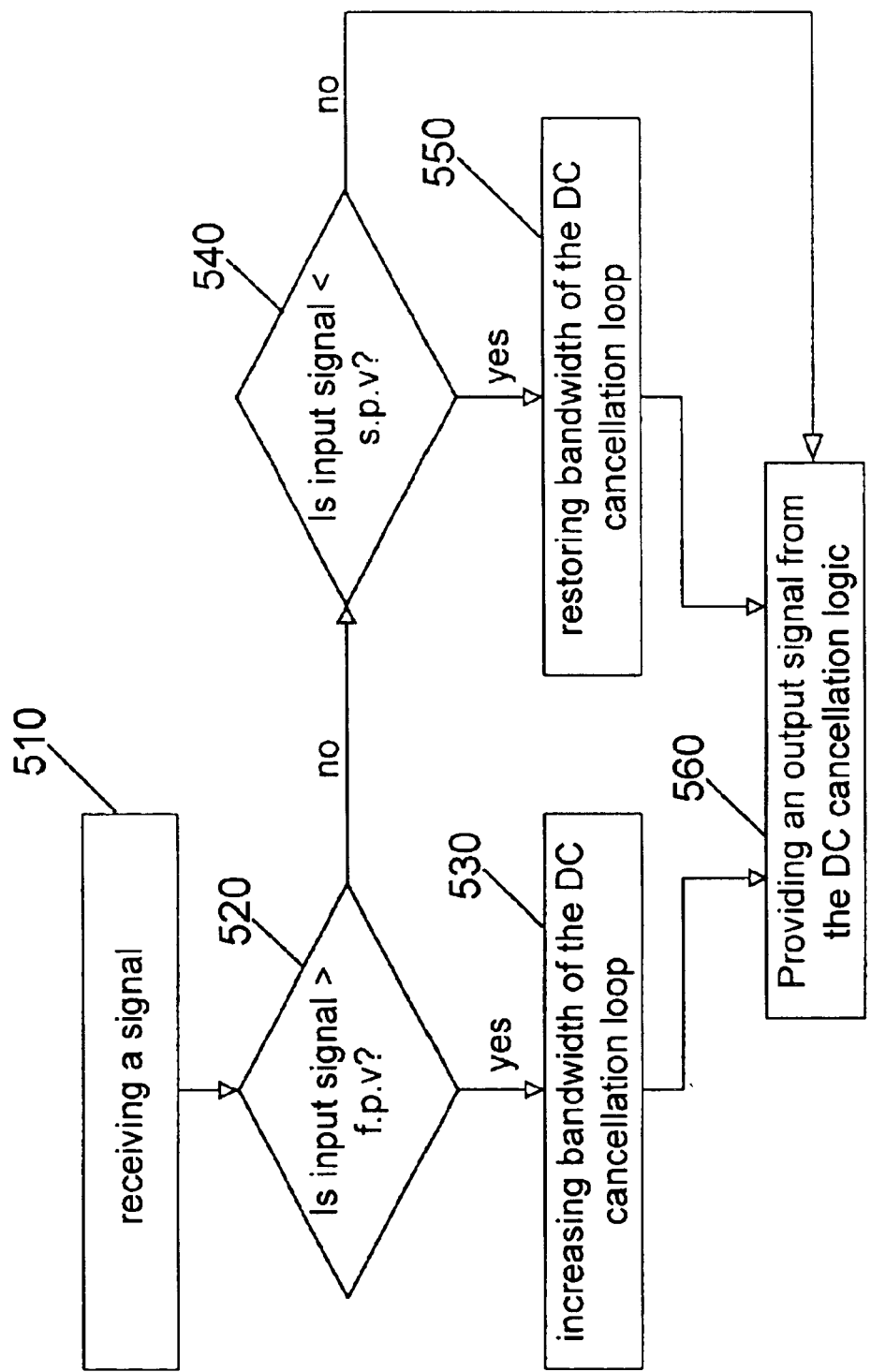
FIG. 5 illustrates an alternative embodiment of a method in accordance with the present invention that may be implemented by the host transceiver of FIG. 2.

FIG. 5 illustrates an alternative method in accordance with the present invention that may be employed by the SLAC 215 of the line card 205 of FIG. 2. The method of FIG. 5 begins at block 510, where the DC cancellation logic 315 receives a signal from the output, terminal of the analog-to-digital converter 305. The signal may have an AC component (voice signal and data (residual) signal) and a transient component, again depending on the "state" of the line card 205. At block 520, the DC cancellation logic 315 determines if the signal is greater than a first preselected value, wherein the first preselected value is an indication that a DC shift may be present. The DC shift may be caused by one of several factors, including when the telephonic device 220 makes a transition from an on-hook to off-hook state, or vice-versa.

At block 530, the DC cancellation logic 315 increases the bandwidth of the DC cancellation loop 298 (as seen from the SLIC 210) using a larger step size in response to determining that the signal is greater than the first preselected value. The bandwidth of the DC cancellation loop 298 may be increased by increasing the gain of an integrator (not shown). For example, during saturation, the corner frequency of the DC cancellation loop 298 may be 40 Hz. The corner frequency may be increased up to 60 Hz in some instances, after which the line cart 205 condition may become unstable.

If, however, the signal at the block 520 is not greater than the first preselected value, then, at block 540, the DC cancellation logic 298 determines if the signal is less than a second preselected value. If the signal is less than the second preselected value, then it is an indication that the line card 205 is no longer in a saturation state (i.e., substantially no DC level shift). Although not so limited, in the illustrated embodiment, the second preselected value is 0.5 volts with respect to the reference voltage 282, which may be 1.4 volts. For hysteresis control, it may be desirable to have the second preselected value less than or different from the first preselected value. The second preselected value in another embodiment may be equal to or less than the first preselected value. If the signal is less than the second preselected value, the DC cancellation logic 315, at block 550, reduces the bandwidth of the DC cancellation loop 298 since the transient state is no longer present. Since the voice component and DC component of the signal from the VIN terminal 285 of the SLAC 215 share the same analog-to-digital converter 305, reducing the bandwidth generally reduces the low frequency distortion for the voice signal that is provided to the CODEC (not shown). In one embodiment, the corner frequency of the DC cancellation loop 298 may be reduced to 19.5 Hz (from 40 Hz), since the line card 205 is out of saturation.

For illustrative purposes, it is hereby assumed that in the instant embodiment the DC cancellation logic 315 employs an integrator (not shown). In such an instance, the output of the DC cancellation logic 315 in accordance with the present invention is governed by equation (2), shown below in time domain.

$$DCANC_n = DCANC_{n-1} + \text{step-size} \times DVIN_n, \quad (2)$$

where $DCANC_n$ is the output signal from the DC cancellation logic 315 to the current limiter 317, $DCANC_{n-1}$ is a previous sample of the output signal of the DC cancellation logic 315, step-size is the adjusted step size for the saturation state, and $DVIN_n$ is the input signal to the DC cancellation logic 315. Increasing the step size of the integrator has an overall effect of increasing the bandwidth of the DC cancellation loop 298. Conversely, decreasing the step size of the integrator reduces the bandwidth of the DC cancellation loop 298. In one embodiment, during the "stable" state, the step size may be 0.002444, and approximately 0.00888 during the "saturation" state. It will be appreciated that a variety of other step sizes may be employed, depending on the specific implementation. At block 560, the DC cancellation logic 315 provides the output signal to the current limiter 317 and to the DC feed logic 321.

Figure 6:
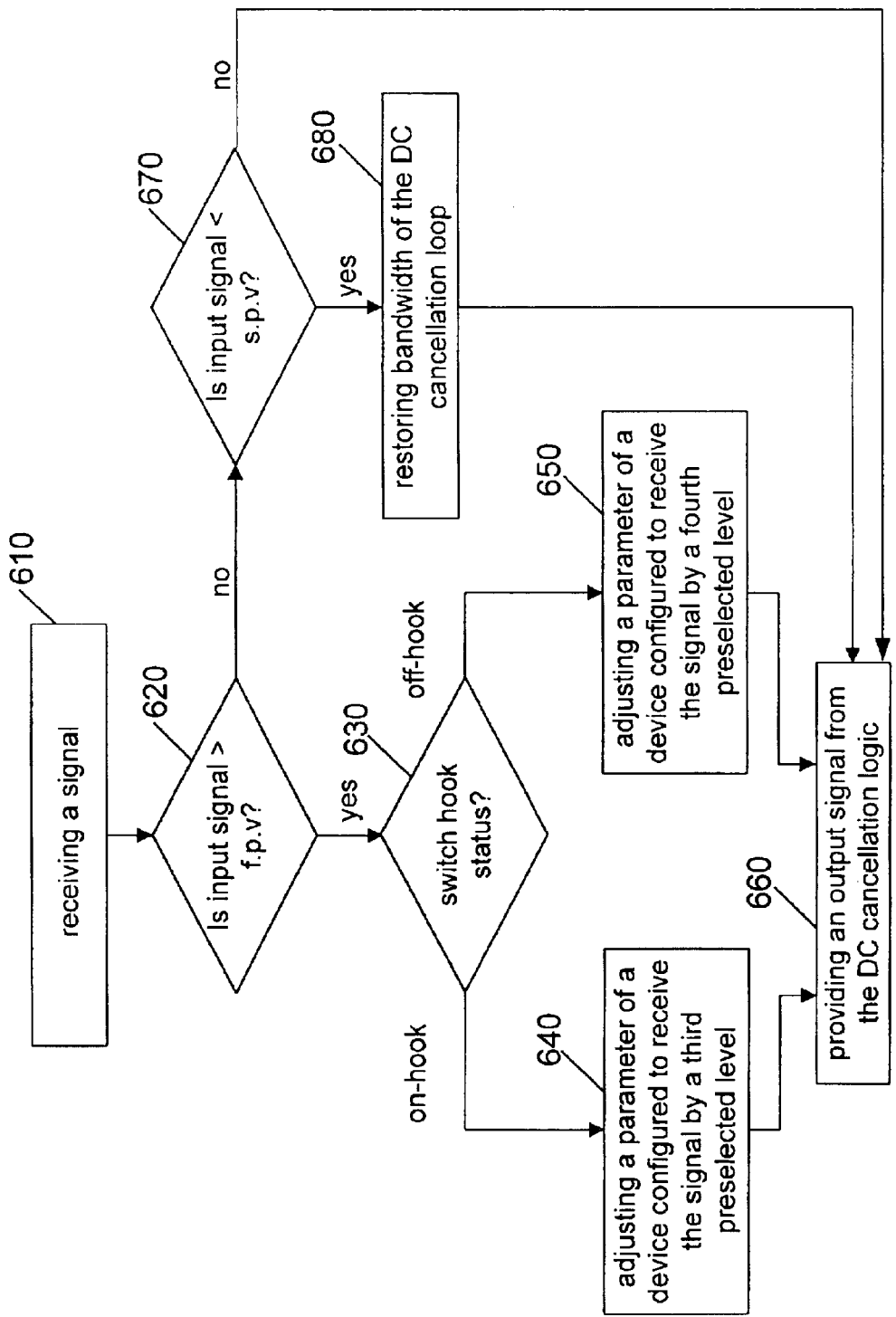
FIG. 6 depicts an alternative embodiment of a method in accordance with the present invention that may be implemented by the host transceiver of FIG. 2.

FIG. 6 illustrates an alternative method in accordance with the present invention that may be employed by the SLAC 215 of the line card 205 of FIG. 2. In this embodiment, the step size of the DC cancellation logic 315 may be changed differently depending on whether the telephonic device 220 transitions from on-hook to off-hook or from off-hook to on-hook. The method of FIG. 6 begins at block 610, where the DC cancellation logic 315 receives a signal from the output terminal of the analog-to-digital converter 305. The signal may have an AC component (voice and data (residual) signals) and a transient component. At block 620, DC cancellation logic 315 determines if the signal is greater than a first preselected value, wherein the preselected value is an indication that a DC level shift may be present.

If the input signal is greater than the first preselected value, then, at block 630, the DC cancellation logic 315 determines if the transition of the telephonic device 220 is from on-hook to off-hook, or vice versa. If the transition is from on-hook to off-hook, then, at block 640, the DC cancellation logic 315 increases a step size of a device (not shown) configured to receive the signal by a third preselected level. In contrast, if the transition is from off-hook to on-hook, then, at block 650, the DC cancellation logic 315 increases a step size of the device configured to receive the signal by a fourth preselected level. By taking into account the direction of the switch-hook transition, the DC cancellation logic 315 is able to satisfy the dial pulse distortion requirement with greater flexibility. For example, it may be possible to reduce the difference in detection time, even though the pulses may have different pulse and rise times. At block 660, the DC cancellation logic 315 provides an output current signal to the current limiter 317 and to the DC feed logic 321.

If the signal to the DC cancellation logic 315, however, is not less than the first preselected value, then at block 670, the DC cancellation logic 315 determines if the input signal is less than a second preselected value. If the input signal is less than the preselected value, then it is an indication that the line card 205 is no longer in a saturation state (i.e., no DC level shift). If the signal is less than the second preselected value, the DC cancellation logic 315, at block 680, reduces the bandwidth of the DC cancellation loop 298 since the transient state is no longer present. Since the voice component and DC component of the input signal from the VIN terminal 285 of the SLAC 215 share the same analog-to-digital converter 305, reducing the bandwidth generally reduces the low frequency distortion for the voice signal that is provided to the CODEC (not shown).

The methods of FIGS. 4–6 allow the host transceiver 105 to expeditiously recover from a saturation condition (i.e., transient state) to a non-saturation condition. Recovering from a saturation condition expeditiously is desirable during switch-hook detection since many line cards 205 determine the on-hook or off-hook state of the telephonic device 220 based on the measured loop voltage and current.

Figure 7:
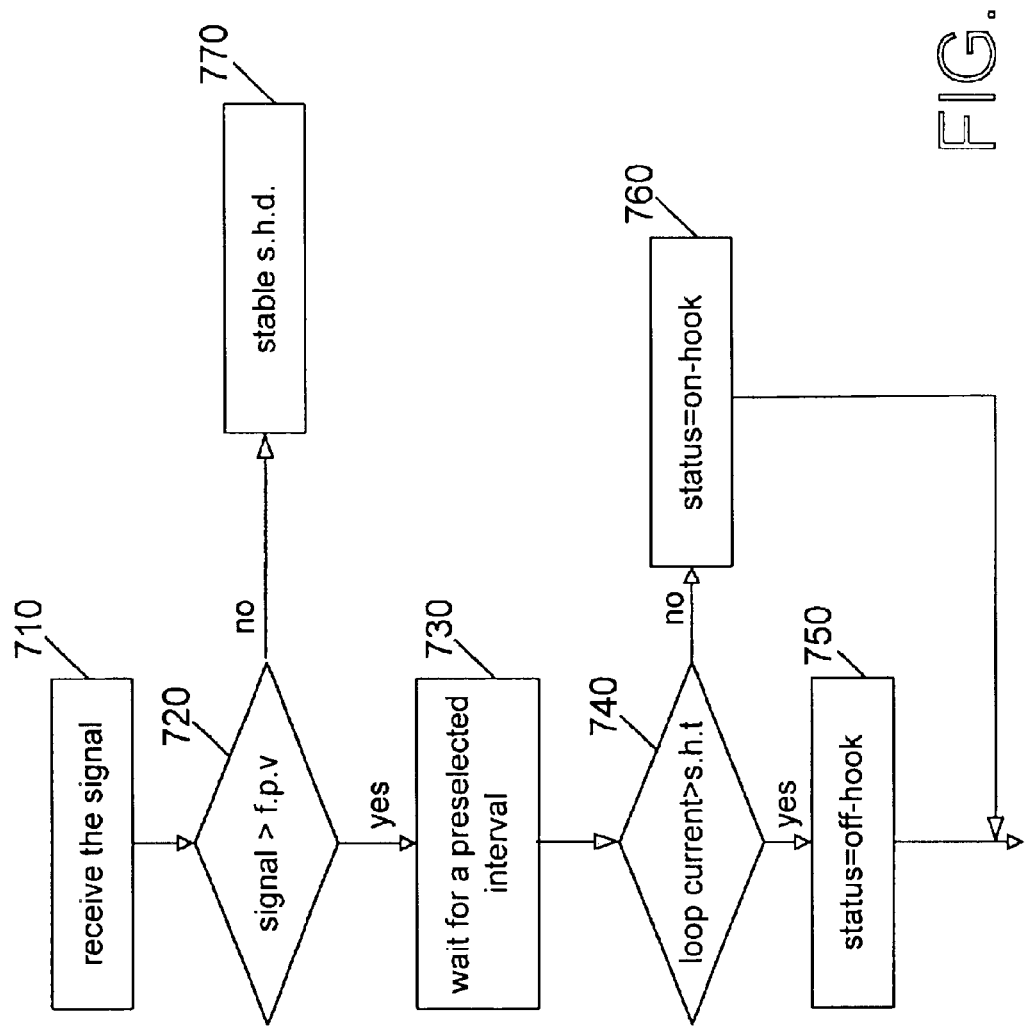
FIG. 7 illustrates a method for dial pulse detection in accordance with the present invention that may be implemented by the host transceiver of FIG. 2.

FIG. 7 illustrates a method in accordance with the present invention that may be employed by the switch hook detection logic 320 (see FIG. 2) of the line card 205 for pulse dial detection. The method begins at block 710, where the switch hook detection logic 320 receives the signal from the output of analog-to-digital converter 305. The signal is a digital signal that may comprise an AC component (voice and data (residual) signals) and a transient component due to DC jumps. At block 720, the switch hook detection logic 320 compares if the output signal from the analog-to-digital converter 305 is greater than the first preselected value. The signal may be higher than the first preselected value because of the transient component due to DC jumps. The high-pass filter effect at the input of the DC cancellation logic 315 detects the presence of the transient component. As described above, the signal being greater than the first preselected value is an indication that the line card 205 is in saturation.

If, at the block 720, the signal is greater than the first preselected value, then, at block 730, the switch hook detection logic 320 waits a preselected time interval to ensure that the line card 205 is no longer in a saturation state. In one embodiment, the preselected interval may be 20 milliseconds. In the instant invention, no debouncing time is required as long as the preselected time interval is longer than the settling time of the low-pass filter of the DC cancellation loop 298 (i.e., as mentioned above, the presence of the integrator within the DC cancellation logic 315 creates a low-pass filter effect at the output of the DC cancellation logic 315, and it is the settling time of this low-pass filter effect that is shorter than the preselected time interval). No debouncing time is required because the switch hook detection logic 320 determines the switch-hook state of the telephonic device 220 based on the loop current derived by the DC cancellation logic 315, which produces an output signal that varies monotonically and smoothly. To ensure that the preselected time interval is longer than the settling time of the low-pass filter that is in effect at the output of the DC cancellation logic 315, the DC cancellation logic 315 in accordance with the methods described in FIGS. 4–6 expedites the transient response of the DC feed logic 321 so that the DC feed response time is fast enough for the dial pulse detection.

Upon the expiration of the preselected interval, the switch hook detection logic 320, at block 740, utilizes the output of the current limiter 317 to determine the switch hook state of the telephonic device 220 during pulse dialing. Specifically, the switch hook detection logic 320 compares the DC output signal from the current limiter 317 against a switch hook threshold value to determine the switch hook state of the telephone device 220. The DC output signal from the current limiter 317 in one embodiment may comprise DC loop current or a current proportional to the DC loop current. In one embodiment, the switch hook threshold value may be 8.2 mA. If the DC output signal from the current limiter 317 is greater than the switch hook threshold, then, at block 750, the status of the telephonic device 220 is determined to be off-hook. Conversely, if the DC output signal from the current limiter 317 is less than the switch hook threshold, then, at block 760, the status of the telephonic device 220 is determined to be on-hook.

If, at the block 720, the output signal from the analog-to-digital converter 305 is not greater than the first preselected value, an indication that the line card 205 is in a stable state, then at block 770, the switch hook detection logic 320 determines the switch hook state of the telephonic device 220. The stable state during pulse dialing may, for example, occur when the line card 205 is in a standby mode. The block 770 is described in more detail below in FIG. 9.

FIG. 8 illustrates an alternative embodiment of the method of FIG. 7. The method of FIG. 8 begins at block 810, where a "counter" variable is initialized to zero. The counter variable in the disclosed embodiment is utilized to wait a preselected time in response to determining that the line card 205 is in a saturation state. At block 812, the switch hook detection logic 320 receives the output signal from the analog-to-digital converter 305. At block 815, the switch hook detection logic 320 determines if the variable counter is zero. During the first pass the counter variable is, as expected, zero, thus, at block 820, the switch hook detection logic 320 compares if the output signal from the analog-to-digital converter 305 is greater than the first preselected value. As described above, the signal being greater than the first preselected value is an indication that the line card 205 is in a saturation state. If, at the block 820, the signal is not greater than the first preselected value, an indication that the line card 205 is in a stable state, then, at the block 770, the switch hook detection logic 320 determines the switch hook state of the telephonic device 220. The block 770 is described in more detail below in FIG. 9.

If the line card 205 is in saturation (ie., the signal is greater than the first preselected value), then, at block 830, the counter variable is incremented by one. At block 840, the counter variable is compared to a time variable, wherein the time variable represents a time interval the switch hook detection logic 320 waits for the line card 205 to recover from saturation. If the counter variable is less than the preselected time interval, the method of FIG. 8 terminates until it is invoked again, as described in more detail below. In the instant embodiment, no debouncing time is required so long as the preselected time interval is longer than the settling time of the low-pass filter (effect) of the DC cancellation loop 298. No debouncing time is required because the switch hook detection logic 320 determines the switch-hook state of the telephonic device 220 based on the loop current derived by the DC cancellation logic 315, which produces an output signal that varies monotonically and smoothly. To ensure that the preselected time interval is longer than the settling time of the low-pass filter that is in effect at the output of the DC cancellation logic 315, the DC cancellation logic 315 in accordance with the methods described in FIGS. 4–6 expedites the transient response of the DC feed logic 321 so that the DC feed response time is fast enough for the dial pulse detection.

Upon detection of a saturation state, and after waiting for the preselected time interval, at block 850, the switch hook detection logic 320 compares the output of the current limiter 317 against the switch hook threshold value to determine the off/on-hook state of the telephonic device 220. If the output signal from the current limiter 317 is less than the switch hook threshold value, then, at block 860, the status of the telephone device 220 is determined to be "on-hook," else, at block 870, it is determined to be "off-hook." At block 880, the counter variable is cleared to zero.

In the illustrated embodiment, the method of FIG. 8 is invoked at a regularly scheduled interval. Specifically, the method of FIG. 8 is invoked every 500 micro-seconds, although the method may be invoked at other time intervals. The entry point of the method each time it is invoked is the block 815. Each time the method of FIG. 8 is invoked, the counter variable is incremented by one. Thus, if the desired preselected time interval is 20 milli-seconds, it follows that the counter variable of 40 would yield a waiting period of 20 milli-seconds (i.e., 40 times 500 micro-seconds).

FIG. 9 illustrates a specific embodiment of the block 770 of FIGS. 7 and 8. Specifically, FIG. 9 illustrates a method that may be employed by the switch hook detection logic 320 to determine the switch-hook state of the telephonic device 220 during the stable state during pulse dialing. The method of FIG. 9 begins at block 910, where a timer variable is initialized to zero. The timer variable in the instant embodiment is utilized to delay the switch hook detection logic 320 to wait at least until the debounce time has elapsed before checking the switch hook state of the telephonic device 220. At block 920, the switch hook detection logic 320 receives the output signal from the analog-to-digital converter 305.

At block 925, the switch hook detection logic 320 compares the output of the current limiter 317 against the switch hook threshold value to determine the switch-hook state of the telephonic device 220. Thus, if the output signal from the current limiter 317 is less than the switch hook threshold value, then, at block 930, the sh_sign variable is designated to "on-hook" state, else, at block 935, the sh_sign variable is designated to be "off-hook." At block 940, the switch hook detection logic 320 determines if the current switch-hook state is different from a previous switch hook state. If the current switch-hook state is different from the previous switch hook state, then the timer variable, at the block 910, is reset to zero, and the method of FIG. 9 restarts. If, however, the current switch hook state is not different from the previous switch hook state, then at block 950, the switch hook determines if the timer variable equals the debounce time. If the timer variable is less than the debouncing time, then the switch hook detection logic 320 continues to check if the switch-hook state of the telephonic device 220 has changed. If no change in the switch hook state of the telephonic device 220 occurs before the timer variable reaches the debounce time, then the switch hook status of the telephonic device 220 after debouncing time has expired is represented by the sh_sign variable, as indicated at block 960.

The instant invention has several advantages over existing methods of pulse dial detection. First, since the switch hook detection during pulse dialing is now based on the loop current derived from the DC cancellation logic 315, the instant invention can expedite the DC feed response by increasing the bandwidth of the DC cancellation loop 298, thereby allowing the DC feed logic to react quickly to changes in the loop impedance. Additionally, because the switch hook detection is based on the derived loop current, presence of non-linear load in the subscriber loop does not impair the switch detection process during pulse detection. Third, since the same preselected time interval is utilized for on-hook and off-hook detection, the dial pulse distortion requirements of different systems can be attained, since the difference between the on-hook indication time and off-hook indication is reduced to substantially zero.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method of switch hook detection for a host transceiver, comprising:
   receiving a signal over a connection from a telephonic device;
   determining if the signal is greater than a first preselected value;
   adjusting a transient response time of the host transceiver configured to receive the signal in response to determining that the signal is greater than the first preselected value; and
   determining a switch hook state of the telephonic device based on a DC component of the signal in response to adjusting at least a portion of the transient response time,
   wherein adjusting the transient response time of the host transceiver includes increasing a bandwidth of a DC cancellation loop by increasing a step size of an integrator.

2. The method of claim 1, wherein the connection is a subscriber line, and wherein the DC component of the signal comprises a signal proportional to a DC current flowing from the subscriber line.

3. The method of claim 1, wherein determining the switch hook state of the telephonic device includes introducing a first preselected interval delay based on a courtier.

4. The method of claim 2, wherein determining the switch hook state of the telephonic device includes introducing a first preselected interval delay based on a counter, and wherein determining the switch hook state of the telephonic device includes determining if the DC current is greater than a second preselected value in response to the delay of the first preselected interval.

5. The method of claim 2, wherein determining if the signal is greater than the first preselected value comprises determining if a portion of the host transceiver is in a saturation slate.

6. The method of claim 1, further including decreasing the bandwidth of the DC cancellation loop in response to determining that the signal is teas than a third preselected value.

7. The method of claim 6, wherein the third preselected value is an indication that the host transceiver is no longer in the saturation state.

8. A method of switch book detection for a host transceiver, comprising:
   receiving a signal over a connection from a telephonic device;
   detecting a transient in the signal:
   waiting, using a counter, a first preselected interval in response to detecting the transient; and
   determining a switch hook state of the telephonic device based on a DC component of the signal in response to waiting the first preselected interval and in response to adjusting a bandwidth of a DC cancellation loop, by adjusting a step size of an integrator.

9. The method of claim 8, wherein the connection is a subscriber line, and wherein the DC component of the signal comprises a signal proportional to a DC current flowing from the subscriber line.

10. The method of claim 9, wherein the tint preselected interval is equal or greater than a settling time of a low-pass filter employed to determine the switch hook state.

11. An apparatus, comprising:
   first logic capable of receiving a signal over a connection from a telephonic device;
   second logic capable of determining if the signal is greater than a first preselected value;
   third logic configured to receive the signal, the third logic being capable of adjusting a transient response time of at least one of a low pass filter and integrator in response to determining that the signal is greater than the first preselected value, wherein adjusting the transient response time of the low pass filter comprises adjusting a filter coefficient of the filter end adjusting the transient of the time integrator comprises adjusting a gain of the integrator; and fourth logic capable of determining a switch hook state of the telephonic device based on a DC component of the signal and in response to waiting a preselected time interval based on a counter.

12. The apparatus of claim 11, wherein the connection is a subscriber line, and wherein the DC component of the signal comprises a signal proportional to a DC current from the subscriber line.

13. The apparatus of claim 12, wherein the fourth logic being capable of determining the switch hook state of the telephonic device includes the fourth logic being capable of determining if the DC current is greater than a second preselected value.

14. The apparatus of claim 12, wherein the second logic being capable of determining if the signal is grater than the flint preselected value comprises the second logic being capable of determining ifs portion of the apparatus is in a saturation state.

15. The apparatus of claim 14, wherein the third logic being capable of adjusting the transient response time of the apparatus includes increasing a step size of an integrator adapted to receive the signal.

16. The apparatus of claim 15 wherein the third logic is further capable of decreasing the step size of the integrator in response to determining that the signal is less than a third preselected value.

17. The apparatus of claim 16, wherein the third preselected value is an indication that the apparatus is no longer in the saturation state.

18. A host transceiver, comprising:
   a terminal capable of receiving a signal; and
   a subscriber line audio-processing circuit communicatively coupled to the terminal, the subscriber line audio-processing circuit capable of:
   determining if the signal is greater than a first preselected value;
   adjusting a transient response of the host transceiver configured to receive the signal in response to determining that the signal is greater than the first preselected value; and
   determining a switch hook state of the telephonic device based ox a DC component of the signal in response to adjusting at least a portion of the transient response time wherein adjusting the transient response time of the host transceiver includes adjusting at least one of a step size of an integrator and adjusting a filter coefficient of a filter.

19. The host transceiver of claim 18, wherein the connection is a subscriber line, and wherein the DC component of the signal comprises a signal proportional to a DC current from the subscriber line.

20. The host transceiver of claim 19, wherein the subscriber line audio-processing circuit being capable of determining the switch book state of the telephonic device includes the subscriber line audio-processing circuit being capable of determining if the DC current is greater than a second preselected value.

21. The host transceiver of claim 19, wherein the subscriber line audio-processing circuit being capable of determining if the signal is greater than the first preselected value comprises the subscriber line audio-processing circuit being capable of determining if a portion of the apparatus is in a saturation slate.

22. The host transceiver of claim 17, wherein the subscriber line audio-processing circuit is further capable of decreasing the step size of the integrator in response to determining that the signal is less than a third preselected value.

23. The host transceiver of claim 22, wherein the third preselected value is an indication that the apparatus is no longer in the saturation state.

24. An apparatus, comprising:
   means for receiving a signal over a connection from a telephonic device;
   means for determining if the signal is greater than a first preselected value;
   means for adjusting a transient response time of the apparatus configured to receive the signal in response to determining that the signal is greater than the first preselected value wherein adjusting the transient response time of the host transceiver includes increasing a bandwidth of a DC cancellation loop by increasing a step size of an integrator; and
   means for determining a switch hook state of the telephonic based on a DC component of the signal in response to adjusting at least a portion of the transient response time.

* * * * *

UNITED STATES PATENT AND TRADEMARK OFFICE
CERTIFICATE OF CORRECTION

PATENT NO. : 6,865,269 B1
DATED : March 8, 2005
INVENTOR(S) : Jin Li and Merle L. Miller It is certified that error appears in the above-identified patent and that said Letters Patent is hereby corrected as shown below:

Column 14,
Line 15, replace "courtier" with -- counter --;
Line 26, replace "slate" with -- state --;
Line 51, replace "tint" with -- first --;
Line 65, replace "end" with -- and --;

Column 15,
Line 16, replace "flint" with -- first --;
Line 17, replace "ifs" with -- if a --;
Line 43, replace "ox" with -- on --; and Column 16,
Line 19, replace "slate" with -- state --.

Signed and Sealed this

Sixth Day of September, 2005

JON W. DUDAS
*Director of the United States Patent and Trademark Office*